E. BAKER.
Devices for Propelling Wagons.
No. 200,016.        Patented Feb. 5, 1878.
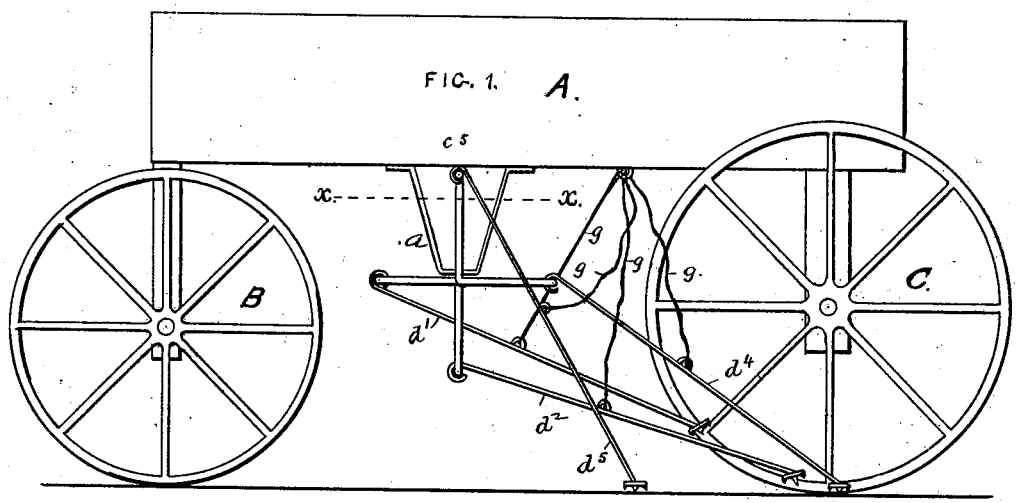
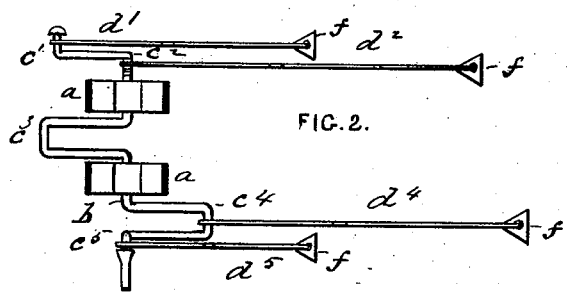
WITNESSES.        INVENTOR.

UNITED STATES PATENT OFFICE.

ELBRIDGE BAKER, OF SALEM, MASSACHUSETTS.

IMPROVEMENT IN DEVICES FOR PROPELLING WAGONS.

Specification forming part of Letters Patent No. 200,016, dated February 5, 1878; application filed October 13, 1876.

*To all whom it may concern:*

Be it known that I, ELBRIDGE BAKER, of Salem, in the county of Essex and State of Massachusetts, have invented Improvements in Wagons, of which the following is a specification:

This improvement in wagons consists in mechanism arranged, as hereinafter described, to act directly on the ground to propel the wagon.

In the accompanying plate of drawings, Figure 1 is a side elevation of a wagon with my improved propelling mechanism, and Fig. 2 a horizontal section on line $x$ $x$, Fig. 1.

In the drawings, A represents a wagon-body, B its fore and C its hind wheels, all as ordinarily.

$a$ $a$ represent two hangers, fastened to under side of wagon-body between the fore and hind wheels B and C.

$b$ represents a horizontal shaft, which crosses the wagon-body, and turns in bearings at the lower ends of the hangers $a$ $a$. This shaft has five crank-arms, $c^1$ $c^2$ $c^3$ $c^4$ $c^5$, to all of which but $c^3$ are loosely hung rods $d^1$, $d^2$, $d^4$, and $d^5$, respectively.

Each rod has a pronged foot-piece, $f$, and between the foot-piece $f$ and the crank-hanging of each rod the rod is suspended by a flexible line, $g$, from the body of the wagon.

Turning the crank-shaft $b$ in any suitable manner causes the pronged foot-pieces $f$ of the rods $d^1$, $d^2$, $d^4$, and $d^5$ to take hold of the ground, and thereby propel the wagon, and by arranging the cranks as is shown in the drawings one rod after the other is brought into and out of action, securing a continuous action of the mechanism to propel the wagon, all as is obvious without further explanation.

The lines $g$ hold and keep the rods to the action of their crank-arms, and cause the rods to be properly brought, from time to time, by the cranks into operating positions on the ground.

Having thus described my invention, what I claim, and desire to secure by Letters Patent, is—

The combination, with the cranks $c^1, c^2, c^3, c^4$, and $c^5$, of the rods $d^1$, $d^2$, $d^4$, and $d^5$, attached, respectively, to the cranks $c^1$, $c^2$, $c^4$, and $c^5$, and the strings $g$, attached to said rods, and to the body of the wagon, the whole constructed and arranged to be operated by means of the crank $c^3$, substantially as herein set forth.

ELBRIDGE BAKER.

Witnesses:
 EDWIN W. BROWN,
 GEO. H. EARL.